United States Patent [19]

Nagashima et al.

[11] Patent Number: 5,547,704
[45] Date of Patent: Aug. 20, 1996

[54] METHOD FOR PRODUCING A MAGNETIC DISK

[75] Inventors: Yasuo Nagashima; Ryuji Shirahata, both of Tokyo, Japan

[73] Assignee: Fuji Photo Film Co., Ltd., Kanagawa, Japan

[21] Appl. No.: 300,542

[22] Filed: Sep. 6, 1994

Related U.S. Application Data

[63] Continuation of Ser. No. 889,390, May 28, 1992, abandoned.

[30] Foreign Application Priority Data

May 31, 1991 [JP] Japan .................................. 3-129299

[51] Int. Cl.$^6$ ........................................................ B05D 5/12
[52] U.S. Cl. .......................... 427/130; 427/131; 427/289; 427/365; 427/377
[58] Field of Search ..................................... 427/130, 131, 427/365, 377, 289; 428/64, 694, 900

[56] References Cited

U.S. PATENT DOCUMENTS

| | | | |
|---|---|---|---|
| 3,398,011 | 8/1968 | Neirotti et al. | 427/130 X |
| 4,499,138 | 2/1985 | Yamamoto | 427/131 X |
| 4,529,659 | 7/1985 | Hoshino et al. | 427/131 X |

*Primary Examiner*—Bernard Pianalto
*Attorney, Agent, or Firm*—Sughrue, Mion, Zinn, Macpeak & Seas; Richard C. Turner; Marie Claire Boisvert

[57] ABSTRACT

A flexible magnetic disk has a first magnetic layer formed on a first surface of a circular polymeric substrate by coating and drying a magnetic coating material. After the first magnetic layer is formed and dried, a second magnetic layer is formed on a second surface of the polymeric substrate by coating and drying the magnetic coating material. The second magnetic layer formed on the second surface is then calendered to form a magnetic recording surface. The resulting magnetic disk provides for an improved surface vibration during high-speed rotation of the disk, and provides very good head touch.

9 Claims, 1 Drawing Sheet

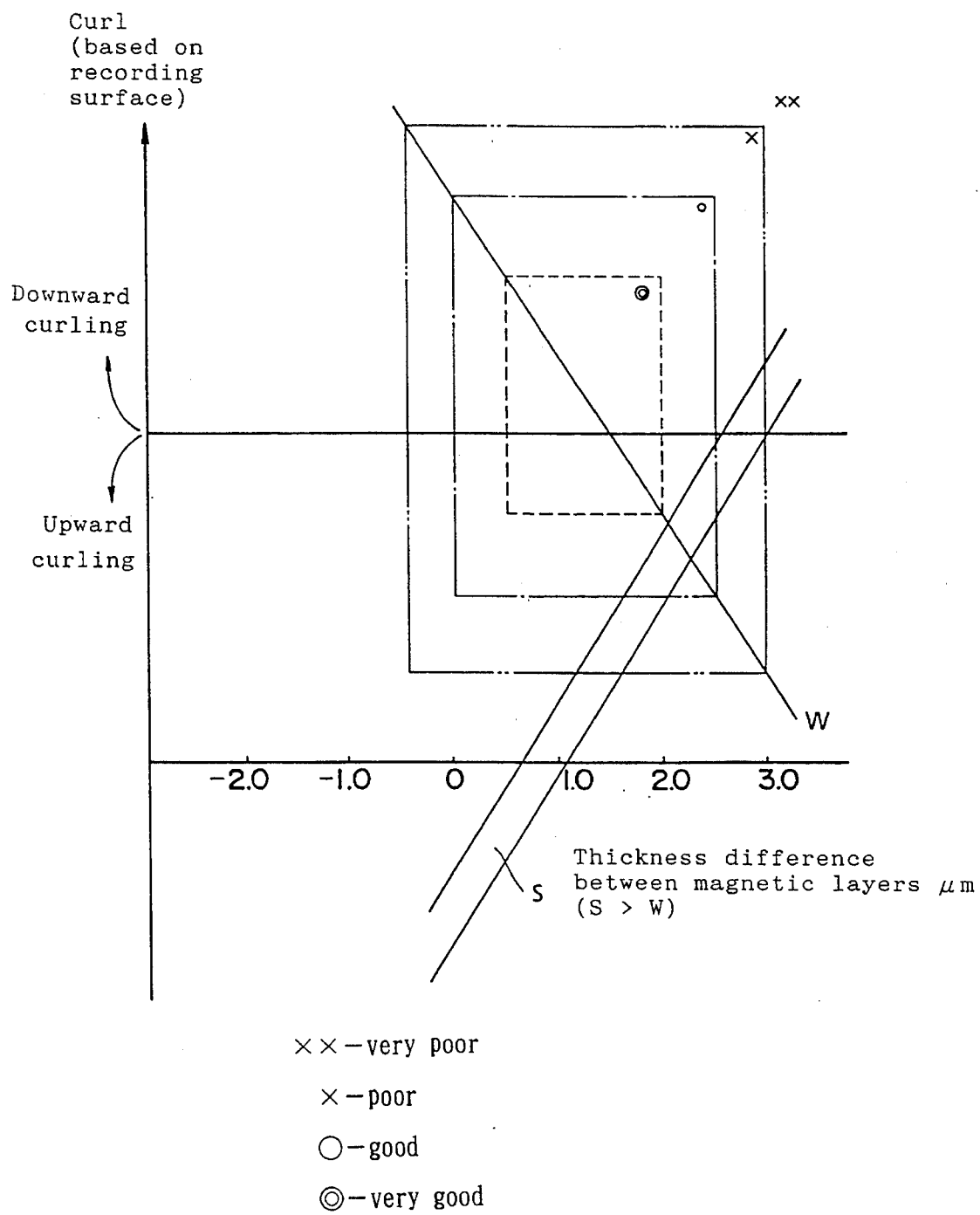

METHOD FOR PRODUCING A MAGNETIC DISK

This is a Continuation of Application No. 07/889,390 filed May 28, 1992, now abandoned.

BACKGROUND OF THE INVENTION

This invention relates to a flexible magnetic disk, in which an improved surface vibration of a recording medium is obtained when the disk is rotated at a high speed.

Recently, there have been proposed electronic still video systems in which a camera device such as a solid state camera device or a camera tube is combined with a magnetic recording apparatus using an inexpensive flexible magnetic disk with a relatively large recording capacity. The proposed electronic still video systems record still image information of a subject on the rotating magnetic disk and reproduce the still image by means of a television system or a video printer.

The flexible magnetic disk used in the systems includes a flexible polymer substrate such as polyethylene terephthalate, polyethylene naphthalate, polyimide, polyphenylene sulfide or the like. A magnetic layer is formed on the substrate by applying a magnetic coating material comprising a metallic magnetic powder dispersed in an organic binder, where the magnetic layer is then dried upon application. The coated substrate is processed into a circular medium and encased in a resin shell such as ABS. The resulting product is generally referred to as a video floppy disk.

In the electronic still video system, a uniform spacing is maintained between the magnetic disk, which rotates at a high speed of 3,600 r.p.m., and a magnetic head. The spacing must be sufficiently small in comparison to a shortest central recording wavelength benchmark of 0.76 µm. Conventional rotating magnetic disks sometimes vibrate in widths of tens to several hundred µm due to a curling or an irregularity of the medium, thereby making it difficult to maintain a uniform space between the disk surface and the head.

Generally, only one side of the magnetic disk employed in the electronic still video system is used for recording and reproduction. However, to maintain a proper curl balance both sides of the magnetic disk are provided with a magnetic layer of the same thickness, so that the total thickness is approximately 40±2 µm. Furthermore, formation of the magnetic layer is achieved by successive coatings, where calendering is performed on the first coating surface or both coating surfaces to obtain a smooth surface.

With the trend being toward compact design of the still video systems, the drive mechanisms are required to be thinner in structure. Specifically, conventional head touch mechanisms are being changed from the known positive pressure types (where a fixed pad is disposed at the rear side of the disk to press and hold the head against the disk or a positive pressure is generated by the air flow) to negative pressure types (where the disk is attracted towards the head using a negative pressure generated by the air flow). Also, there is an increasing demand for an improved magnetic disk which maintains a low surface vibration during rotation of the disk at high speeds.

With a view to eliminate the above known problems, it is a primary object of the present invention to provide a flexible magnetic disk in which an improved surface vibration of the recording medium is obtained at high-speed rotation of the magnetic disk.

SUMMARY OF THE INVENTION

In accordance with the present invention, there is provided a flexible magnetic disk formed on a circular polymeric substrate where a first magnetic layer is formed on a first surface of the polymeric substrate by coating and drying a magnetic coating material. After the first magnetic layer is formed and dried, a second magnetic layer is formed on a second surface of the polymeric substrate by coating and drying the magnetic coating material. The second magnetic layer formed on the second surface is then calendered to form a magnetic recording surface.

In the above arrangement, the first magnetic layer is provided to be greater in thickness than the second magnetic layer, where the difference in thickness between the first magnetic layer and the second magnetic layer is 0.5 to 2.0 µm.

BRIEF DESCRIPTION OF THE DRAWING

The FIGURE is a diagram showing the relationship between thickness difference of the magnetic layers of the magnetic disk and curling.

DETAILED DESCRIPTION OF THE INVENTION

The polymeric substrate used in the present invention is a film or sheet made of a polymer selected from polyesters such as polyethylene terephthalate (PET), polyethylene naphthalate or the like, polyolefins such as polypropylene or the like, cellulose derivatives such as cellulose acetate, cellulose diacetate or the like, vinyl resins such as polyvinyl chloride, polyvinylidene chloride or the like, polycarbonate, polyamide, polyamideimide, and polyimide or the like. The polymeric substrate preferably has a thickness of 27 to 38 µm.

The magnetic layer comprises a particle ingredient such as a ferromagnetic powder or the like and a binder in which the particle ingredient is dispersed. The magnetic layer can be coated using a conventional method known in the art. For example, the binder, the ferromagnetic powder, an abrasive, a hardener, a lubricant, an antistatic agent and the like are mixed and kneaded with a solvent to obtain a magnetic coating material. The resulting magnetic coating material is coated on the polymeric substrate by doctor coating, reverse coating, extrusion coating, spin coating or the like.

In the present invention, the magnetic layer is coated on both sides of the substrate. After the magnetic coating material is coated on one side of the substrate and dried to form the first magnetic layer, the magnetic coating material is coated on the uncoated rear side of the substrate and dried to form the second magnetic layer. The thickness of either the first or second magnetic layer is preferably 2.0 to 5.5 µm where the thickness of the polymeric substrate is 27 to 38 µm.

The ferromagnetic powder used in the magnetic layer can be a known ferromagnetic powder based on iron oxide such as $\gamma\text{-Fe}_2\text{O}_3$, Co-containing $\epsilon\text{-Fe}_2\text{O}_3$, $\text{Fe}_3\text{O}_4$, Co-containing $\text{Fe}_3\text{O}_4$ or the like, or $\text{CrO}_2$. Alternatively, the ferromagnetic powder can be an alloy magnetic powder such as a Co-Ni-P alloy, a Fe-Ni alloy, a Fe-Ni-Cr alloy, a Fe-Co-Ni alloy or the like. In particular, it is preferable to use an alloy magnetic powder to meet high-density magnetic recording characteristics required for a video floppy disk.

The binder can be based on known thermoplastic resins, thermosetting resins, reactive resins, or mixtures thereof. These resins can be vinyl .chloride copolymers (vinyl acetate-vinyl acetate copolymer, vinyl chloride-vinyl acetate-vinylalcohol copolymer, vinyl chloride-vinyl acetate-acrylic acid copolymer, vinyl chloride-vinylidene chloride copolymer, vinyl chloride-acrylonitrile copolymer or the like); cellulose derivatives such as nitrocellulose resin, acrylic resins, polyvinyl acetal resins, polyvinyl butyral resins, epoxy resins, or phenoxy resins; or polyurethane resins (polyester-polyurethane resins, polycarbonate-polyurethane resins or the like).

When a hardener is required, a polyisocyanate compound is used, which is selected from the group of polyisocyanate compounds used as hardeners for polyurethane resins. When the binder is cured by irradiation with an electron beam, a compound such as urethane acrylate having a reactive double bond can also be used as a hardener.

The above ferromagnetic powder and the binder are kneaded with a solvent of a type which is used in the preparation of known magnetic coating materials (e.g., methylethylketone, dioxane, cyclohexane, ethyl acetate, butyl acetate or the like) to obtain a magnetic coating material.

As needed, the magnetic coating material may be mixed with additives such as an abrasive ($\alpha$-$Al_2O_3$, $Cr_2O_3$ or the like), an antistatic agent (carbon black or the like), and a lubricant (fatty acid, fatty acid ester, silicone oil or the like).

The substrate coated with the magnetic layer and dried is then calendered. In the present invention, as discussed above, calendering is performed only on the surface of the second magnetic layer which is formed at the second coating step. In calendering, the coated substrate is passed under pressure between a mirror-polished metal roll, while contacting the surface of the magnetic layer with the metal roll which is heated to a high temperature, and an elastic roll such as a cotton roll, a filmat roll, a Nylon roll or the like to smoothen the surface of the magnetic layer. For this purpose, a known supercalender system can be used. Calendering is preferably performed at a temperature of 50° to 100° C., under a linear pressure of 50 to 400 kg/cm, and at a speed of 50 to 400 m/minute.

After that, the magnetic layer-coated substrate is punched to form a disk medium which has a circular hole at the center, heat treated as needed, incorporated with mechanical parts comprising a resin center core, an upper core, and adhesion rings, then encased in a shell to obtain a floppy disk. Heat treatment of the medium is preferably carried out at a temperature of 50° to 100° C. and a humidity of 20 to 80% RH for a period of 12 to 100 hours.

To minimize curling in the flexible magnetic disk provided according to the present invention, the second magnetic layer is subjected to drying only at the formation of the second magnetic layer and calendering, whereas the first magnetic layer is subjected to both drying at the formation of the first magnetic layer and at the formation of the second magnetic layer. As a result, the magnetic disk tends to curl during heat treatment so that the magnetic recording surface comes "inside". However, curling is smaller than for the case the first magnetic layer is calendered. If the first magnetic layer is calendered and used as a magnetic recording surface, since this surface is subjected to two drying steps and calendering, whereas the backside is subjected to only one drying step, the magnetic disk tends to considerably curl so that the magnetic recording surface comes "outside".

Furthermore, in the flexible magnetic disk according to the present invention, the thickness of the first magnetic layer is greater than that of the second magnetic layer, thereby reducing the curling tendency even further.

If curling when the first magnetic layer is calendered is to be prevented by the difference in thickness between the magnetic layers, the thickness of the magnetic layer of the one side must be considerably increased, resulting in insufficient drying and a poor head touch.

Minimizing the curl of the flexible magnetic disk allows for the magnetic disk to maintain a uniform space between the disk surface and the magnetic head during reproduction of an electronic still video.

The following examples are provided to clarify the benefits provided by the present invention.

EXAMPLE 1

| | |
|---|---|
| Ferromagnetic powder (99% Fe, 1% Ni, specific surface area: 50 $m^2/g$, coercive force: 1,250 Oe, saturation magnetization: 135 emu/g) | 100 parts by wt. |
| Vinyl chloride-vinyl acetate-maleic anhydride copolymer | 10 |
| Polyurethane resin | 5 |
| Polyisocyanate compound | 7 |
| Carbon black (average particle diameter: 0.03 μm) | 3 |
| $Cr_2O_3$ (average particle diameter: 0.5 μm) | 10 |
| Methylethylketone | 70 |

The above described magnetic coating composition was kneaded for 70 minutes, mixed with 300 parts by weight of methylethylketone and dispersed by a sand grinder for 2.5 hours to obtain a magnetic coating solution. The resulting magnetic coating solution was coated on both sides of a 32 μm thick polyethylene terephthalate film-based non-magnetic substrate, provided with a 0.3 μm adhesion underlayer, to form magnetic layers.

After a first magnetic layer was coated on one side of the film substrate and dried (hereinafter referred to as surface S), a second magnetic layer was formed on the backside using the same procedure (hereinafter referred to as surface W). In this example, the thicknesses of the magnetic layers on the surfaces S and W were varied to prepare samples as shown in Table 1.

TABLE 1

| | (unit: μm) | | | | | | | |
|---|---|---|---|---|---|---|---|---|
| Sample No. | 1 | 2 | 3 | 4 | 5 | 6 | 7 | 8 |
| Thickness difference | −1.0 | −0.5 | 0 | 0.5 | 1.0 | 1.5 | 2.0 | 2.5 |
| S | 4.0 | 4.0 | 4.0 | 4.5 | 5.0 | 5.0 | 5.0 | 5.5 |
| W | 5.0 | 4.5 | 4.0 | 4.0 | 4.0 | 3.5 | 3.0 | 3.0 |

Then, the surface S or W was calendered at a temperature of 80° C., under a linear pressure of 300 kg/cm, and at a speed of 100 m/minute to obtain magnetic media. The magnetic media were punched to form 2-inch floppy disks, heat treated by allowing them to stand at 70° C. and 30% RH for 72 hours, and encased in shells to prepare 2-inch floppy disk samples. As shown on Table 2, the samples calendered on the surface S are referred to as 1-S to 8-S, and those calendered on the surface W are referred to as 1-W to 8-W.

The thus obtained video floppy disks were evaluated for head touch using an electronic still video camera provided with a negative pressure head touch mechanism. The head touch was measured from the shape of envelope when a 7 MHz signal was recorded and reproduced. The results are shown in Table 2.

TABLE 2

| Sample No. | Head touch | Sample No. | Head touch |
|---|---|---|---|
| 1-S | Very poor | 1-W | Very poor |
| 2-S | Very poor | 2-W | Poor |
| 3-S | Very poor | 3-W | Good |
| 4-S | Very poor | 4-W | Very good |
| 5-S | Very poor | 5-W | Very good |
| 6-S | Poor | 6-W | Very good |
| 7-S | Good | 7-W | Very good |
| 8-S | Good | 8-W | Good |

As can be seen from Table 2 and FIG. 1, the W-calendered video floppy disks exhibit much better head touch than the S-calendered video floppy disks.

FIG. 1 plots these results in relation to disk curling where, downward curling is when the magnetic recording surface comes "inside", and upward curling is when magnetic recording surface comes "outside". Curling in the W-calendered video floppy disks occurs along the line W, whereas curling in the S-calendered video floppy disks occurs within the region S.

Furthermore, head touch depends upon the degree of curling and the difference in thickness between the magnetic layers on both sides. When the thickness difference is too large, adverse effects such as poor coating and drying tend to occur, resulting in a deteriorated head touch.

Therefore, the range for very good head touch is that where the thickness of the magnetic layer on the surface S is larger than the thickness of the magnetic layer on the surface W by 0.5 to 2.0 μm.

EXAMPLE 2

| | |
|---|---|
| Ferromagnetic powder (96% Fe, 4% Ni, specific surface area: 45 m²/g, coercive force: 1,350 Oe, saturation magnetization: 130 emu/g) | 100 parts by wt. |
| Vinyl chloride-vinyl acetate-vinylalcohol copolymer | 12 |
| Polyurethane resin | 10 |
| Polyisocyanate compound | 7 |
| Carbon black (average particle diameter: 0.03 μm) | 3 |
| Cr₂O₃ (average particle diameter: 0.5 μm) | 5 |
| α-Al₂O₃ (average particle diameter: 0.4 μm) | 5 |
| Toluene | 150 |
| Methylethylketone | 150 |

The above described magnetic coating composition was dispersed by a sand grinder to obtain a magnetic coating solution. This magnetic coating solution was coated on both sides of a 30 μm thick polyethylene terephthalate film-based non-magnetic substrate, provided with a 0.3 μm adhesion underlayer mainly comprising polyester, to form magnetic layers.

After a magnetic layer was coated on one side of the film substrate and dried (hereinafter referred to as surface S), a magnetic layer was formed on the backside using the same procedure (hereinafter referred to as surface W). In this example the thicknesses of the magnetic layers on the surfaces S and W were varied to prepare samples as shown in Table 3.

TABLE 3

| | (unit: μm) | | | | | | | |
|---|---|---|---|---|---|---|---|---|
| Sample No. | 9 | 10 | 11 | 12 | 13 | 14 | 15 | 16 |
| Thickness difference | −1.0 | −0.5 | 0 | 0.5 | 1.0 | 1.5 | 2.0 | 2.5 |
| S | 4.5 | 4.5 | 4.5 | 5.0 | 5.5 | 5.5 | 5.5 | 5.5 |
| W | 5.5 | 5.0 | 4.5 | 4.5 | 4.5 | 4.0 | 3.5 | 3.0 |

Then, the surface S or W was calendered at a temperature of 80° C., under a linear pressure of 300 kg/cm, and at a speed of 100 m/minute to obtain magnetic media. The magnetic media were punched to form 2-inch floppy disks, heat treated by allowing them to stand at 60° C. and 70% RH for 48 hours, and encased in shells to prepare 2-inch floppy disk samples. As shown in Table 4, the samples calendered on the surface S are referred to as 9-S to 16-S, and those calendered on the surface W are referred to as 9-W to 16-W.

The thus obtained video floppy disks were evaluated for head touch as in Example 1 using an electronic still video camera provided with a negative pressure head touch mechanism. The results are shown in Table 4. Evaluation criteria are the same as those in Table 2.

TABLE 4

| Sample No. | Head touch | Sample No. | Head touch |
|---|---|---|---|
| 9-S | Very poor | 9-W | Very poor |
| 10-S | Very poor | 10-W | Poor |
| 11-S | Very poor | 11-W | Good |
| 12-S | Very poor | 12-W | Very good |
| 13-S | Very poor | 13-W | Very good |
| 14-S | Poor | 14-W | Very good |
| 15-S | Good | 15-W | Very good |
| 16-S | Good | 16-W | Good |

As can be seen from Table 4, similar to the results in Example 1, the surface W-calendered video floppy disks show very good head touch.

As described above, the flexible magnetic disk according to the present invention is improved in surface vibration of the medium during high-speed rotation and provides very good head touch, especially suitable for use with a still video system of a negative pressure head-type.

What is claimed is:

1. A method for producing a magnetic disk formed on a circular polymeric substrate comprising the steps of:

(a) forming a first magnetic layer on a first surface of a circular polymeric substrate by applying a coating material, comprising magnetic particles dispersed in a resin binder, to said first surface;

(b) drying said first magnetic layer;

(c) forming a second magnetic layer on a second surface of said polymeric substrate by applying said coating material to said second surface;

(d) drying said first magnetic layer and said second magnetic layer; and (e) calendering Only said second magnetic layer to form a magnetic recording surface, said first magnetic layer being dried twice, and said second magnetic layer being dried once and subsequently calendered, to minimize curling in said magnetic disk.

2. A method for producing a magnetic disk of claim 1 wherein a thickness of the first magnetic layer is greater than a thickness of the second magnetic layer.

3. A method for producing a magnetic disk of claim 2 wherein a difference in thickness between the first magnetic layer and the second magnetic layer is 0.5 to 2.0 µm.

4. A method for producing a magnetic disk of claim 3 wherein the polymeric substrate is a material selected from the group consisting of polyesters including polyethylene terephthalate (PET) and polyethylene naphthalate, polyolefins including polypropylene, cellulose derivatives including cellulose acetate and cellulose diacetate, vinyl resins including polyvinyl chloride and polyvinylidene chloride, polycarbonate, polyamide, polyamideimide, and polyimide.

5. A method for producing a magnetic disk of claim 3 wherein the polymeric substrate has a thickness of 27 to 38 µm.

6. A method for producing a magnetic disk of claim 5 wherein the thickness of at least one of the first and second magnetic layer is 2.0 to 5.5 µm.

7. A method for producing a magnetic disk of claim 1 further comprising the steps of:
   (f) forming a product from step (e) to produce a disk medium; and
   (g) performing a heat treatment on the disk medium.

8. A method for producing a magnetic disk of claim 7 wherein the heat treatment is performed at a temperature of 50° to 100° C. and a humidity of 20 to 80% RH for a period of 12 to 100 hours.

9. A method for producing a magnetic disk formed on a circular polymeric substrate comprising the steps of:
   (a) forming a first magnetic layer on a first surface of a circular polymeric substrate by applying a coating material, comprising magnetic particles dispersed in a resin binder, to said first surface;
   (b) drying said first magnetic layer;
   (c) forming a second magnetic layer on a second surface of said polymeric substrate by applying said coating material to said second surface;
   (d) drying said first magnetic layer and said second magnetic layer; and
   (e) calendering only said second magnetic layer to form a magnetic recording surface, said first magnetic layer being dried twice, and said second magnetic layer being dried once and subsequently calendered, to minimize curling in said magnetic disk;
   wherein a thickness of said first magnetic layer is greater than a thickness of said second magnetic layer; and
   wherein a difference in thickness between said first magnetic layer and said second magnetic layer is 0.5 to 2.0 µm.

* * * * *